(12) United States Patent
Boonekamp et al.

(10) Patent No.: US 11,347,038 B2
(45) Date of Patent: May 31, 2022

(54) OPTICAL SYSTEM AND LIGHTING DEVICE

(71) Applicant: SIGNIFY HOLDING B.V., Eindhoven (NL)

(72) Inventors: Erik Paul Boonekamp, Bunnik (NL); Marcellus Jacobus Johannes Van Der Lubbe, Best (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/419,145

(22) PCT Filed: Jan. 14, 2020

(86) PCT No.: PCT/EP2020/050736
§ 371 (c)(1),
(2) Date: Jun. 28, 2021

(87) PCT Pub. No.: WO2020/148242
PCT Pub. Date: Jul. 23, 2020

(65) Prior Publication Data
US 2022/0107486 A1    Apr. 7, 2022

(30) Foreign Application Priority Data
Jan. 15, 2019 (EP) ..................... 19151772

(51) Int. Cl.
*G02B 19/00* (2006.01)
*F21V 5/00* (2018.01)
(Continued)

(52) U.S. Cl.
CPC .......... *G02B 19/0066* (2013.01); *F21V 5/004* (2013.01); *F21V 5/007* (2013.01);
(Continued)

(58) Field of Classification Search
CPC ... G02B 19/0066; G02B 3/0068; F21V 5/004; F21V 5/007
See application file for complete search history.

(56) References Cited

U.S. PATENT DOCUMENTS

2010/0321640 A1    12/2010 Yeh et al.
2012/0147333 A1*   6/2012 Jorgensen ............... G03B 33/12
                                                    353/31
(Continued)

FOREIGN PATENT DOCUMENTS

KR    2018094581 A    8/2018
WO    2014117704 A2   8/2014
WO    2018086980 A1   5/2018

*Primary Examiner* — Evan P Dzierzynski
(74) *Attorney, Agent, or Firm* — Daniel J. Piotrowski (57) ABSTRACT

An optical system (10) is disclosed comprising a plurality of solid state lighting elements (30, 30', 30") belonging to different groups, wherein solid state lighting elements of different groups produce luminous outputs having different spectral compositions, a collimator array (20) comprising a plurality of domains (23, 23', 23"), each domain comprising a plurality of collimators (21, 21'), wherein within each domain each collimator is arranged to collimate the luminous output of at least one solid state lighting element such that each domain contains a number of solid state lighting elements arranged in a spatial pattern, said number consisting of a fixed ratio of solid state lighting elements from each group, and wherein said spatial pattern is varied between domains and a lenslet plate (40) having a first lenslet array on a first surface (41) facing the collimator array and a second lenslet array identical to the first lenslet array on a second surface (43) opposing the first surface, wherein each lenslet (42) of the first lenslet array is aligned with a corresponding lenslet (44) of the second lenslet array. Each lenslet array is composed of a plurality of unit cells (46) comprising a plurality of lenslets in a defined pattern, each (Continued)

of said domains being aligned with one of said unit cells. Also disclosed is a lighting device (1) comprising such an optical system (10).

15 Claims, 10 Drawing Sheets (51) Int. Cl.
  *G02B 3/00* (2006.01)
  *F21Y 115/10* (2016.01)
  *F21Y 113/13* (2016.01)

(52) U.S. Cl.
  CPC ......... *G02B 3/0068* (2013.01); *F21Y 2113/13* (2016.08); *F21Y 2115/10* (2016.08)

(56) References Cited

U.S. PATENT DOCUMENTS

| | | | |
|---|---|---|---|
| 2013/0271994 A1* | 10/2013 | Hsu | F21V 5/007 362/259 |
| 2015/0109773 A1* | 4/2015 | Li | F21V 13/12 362/231 |
| 2016/0363288 A1* | 12/2016 | McKendry | F21V 5/007 |
| 2017/0146204 A1 | 5/2017 | Di Trapani et al. | |
| 2017/0292682 A1 | 10/2017 | Sepkhanov | |
| 2018/0132330 A1 | 5/2018 | Chong et al. | |
| 2018/0313519 A1 | 11/2018 | Lacroix | |

\* cited by examiner

OPTICAL SYSTEM AND LIGHTING DEVICE

CROSS-REFERENCE TO PRIOR APPLICATIONS

This application is the U.S. National Phase application under 35 U.S.C. § 371 of International Application No. PCT/EP2020/050736, filed on Jan. 14, 2020, which claims the benefit of European Patent Application No. 19151772.1, filed on Jan. 15, 2019. These applications are hereby incorporated by reference herein.

FIELD OF THE INVENTION

The present invention relates to an optical system comprising a plurality of groups of solid state lighting elements, wherein solid state lighting elements of different groups produce luminous outputs having different spectral compositions, a collimator array comprising a plurality of collimators arranged to collimate the luminous output of at least one solid state lighting element of said plurality of groups of solid state lighting elements and a lenslet plate having a first lenslet array on a first surface facing the collimator array and a second lenslet array identical to the first lenslet array on a second surface opposing the first surface, wherein each lenslet of the first lenslet array is aligned with a corresponding lenslet of the second lenslet array.

The present invention further relates to a lighting device comprising such an optical system.

BACKGROUND OF THE INVENTION

Solid state lighting devices have become increasingly popular due to the favourable energy consumption, lifetime and robustness of such devices compared to lighting technologies such as incandescent lighting devices. Moreover, as the cost of such SSL devices is reducing, a larger market penetration is achieved.

Technological advances in the field of solid state lighting for example has led to a reduction in the size of individual SSL elements, which may comprise one or more individual LEDs. Such small footprint SSL elements are sometimes referred to as mini LEDs or micro LEDs, and are for instance now being used in lighting devices for accent lighting, e.g. spot lights, in which individual addressability of the SSL elements comprised in such lighting devices that produce luminous outputs of different spectral compositions, e.g. different colours, provides lighting devices that are colour tuneable.

However, the inclusion of SSL elements producing luminous outputs having different spectral compositions such as different colours is not without problems. Due to the spatial distribution of such SSL elements across a carrier such as a printed circuit board, these different spectral components are spatially separated from each other, which leads to visible artefacts such as colour separation in the light beams or spots produced with such lighting devices. In order to compensate for this, the optical system of such a lighting device must further include several optical elements such as lenses and diffusers that mix the various spatial components of the luminous output of the lighting device.

An example of such an optical system can be found in US 2018/132330 A1, which discloses a multi-color micro-LED array light source including a thermally conductive substrate and multiple arrays of different color micro-LEDs integrated on the thermally conductive substrate. The micro-LEDs within each array are electrically connected so that they can all be driven in unison. The multi-color array light source also includes a controller that is electrically coupled to and that drives the arrays of micro-LEDs. The controller drives the micro-LEDs in a manner that produces an output light distribution with a spatial wavelength and angular distribution that is suitable for use as a light source. However, a rather involved optical arrangement and driver control mechanism is required to achieve the desired colour uniformity, which yields an optical system that is rather bulky.

SUMMARY OF THE INVENTION

The present invention seeks to provide a compact optical system that can produce symmetric beams with excellent spatial uniformity.

The present invention further seeks to provide a lighting device comprising such an optical system.

According to an aspect, there is provided an optical system comprising a plurality of solid state lighting elements belonging to L different groups, wherein L being a positive integer of at least 2, and wherein solid state lighting elements of different groups produce luminous outputs having different spectral compositions; a collimator array comprising a same number of plurality of domains, wherein the domains mutually have the same shape and each domain comprises a same number of plurality of collimators, wherein within each domain each collimator is arranged to collimate the luminous output of at least one solid state lighting element such that each domain contains a same number of solid state lighting elements arranged in a spatial pattern, said same number consisting of a fixed ratio of solid state lighting elements from each group, and wherein said spatial pattern is varied between domains; and a lenslet plate having a first lenslet array on a first surface facing the collimator array and a second lenslet array identical to the first lenslet array on a second surface opposing the first surface, wherein each lenslet of the first lenslet array is aligned with a corresponding lenslet of the second lenslet array and each lenslet array is composed of a plurality of unit cells comprising a plurality of lenslets in a defined pattern, each of said domains being aligned with one of said unit cells. In particular, each domain is aligned with a respective associated one of said unit cells, hence the number of domains is the same as the number of unit cells.

The present invention is based on the insight that by using a lenslet plate comprising a plurality of identical unit cells or tiles, excellent spatial homogeneity in the luminous output of the optical system can be achieved by aligning each unit cell with a group of collimators forming a domain of a collimator array. By ensuring that each domain contains the same number of SSL elements from different groups of SSL elements in a fixed ratio, the luminous flux and spectral composition produced by each domain is kept constant, whilst varying the spatial distribution of the SSL elements of the different groups of SSL elements between domains ensures that when the respective luminous outputs of these domains are combined in the far field by the lenslet plate, the spatial separation in the respective luminous outputs of these domains is largely cancelled out, thereby yielding a compact optical system, e.g. having a thickness of less than 10 mm, that is colour tuneable and produces a luminous output with good spatial uniformity. Such a variation preferably is a systematic variation, e.g. a variation such that each possible permutation of the spatial pattern is present in the collimator array, in order to optimize colour mixing for instance. However, other types of variations such as incomplete variations in which certain permutations of the spatial pattern are omitted, (semi-)random variations and so on, may also be considered. It is furthermore noted for the avoidance of doubt that the different domains do not need to be unique in terms of the spatial distribution of its SSL elements; the collimator array may comprise multiple domains with the same spatial distribution of SSL elements, for example in a scenario in which the collimator array comprises a plurality of identical groups or clusters of domains across which the spatial distribution is systematically varied across the group or cluster, e.g. such that each permutation of this spatial distribution is present within each group or cluster.

Moreover, such an optical system can be easily scaled due to the tiled nature of the lenslet array. Preferably, the light rays produced by the collimator array have a maximum angle relative to the optical axis of the optical system, said maximum angle not exceeding an actual acceptance angle of the lenslet plate to ensure effective mixing of the incident light rays by the lenslet plate.

In the context of the present application, the terms 'acceptance angle' and integration angle' are used interchangeably. As will be readily understood by the skilled person, where reference is made to the acceptance angle of the lenslet array, this term is meant to express the behaviour of the lenslet plate as a whole, e.g. in case of identical lenslet pairs all having the same acceptance angle, in which case the individual acceptance angles equate to the acceptance angle of the lenslet plate, as well as in the case of overlapping lenslet pairs, in which the effective acceptance angle of the lenslet plate is some numerical average of the acceptance angles of the individual lenslet pairs. The acceptance angle and effective acceptance angle are both referred to as the actual acceptance angle of the lenslet plate in this application. In other words, light rays entering the lenslet plate under an angle not exceeding the acceptance angle of the lenslet plate are effectively spatially mixed by the lenslet plate, whereas light rays entering the lenslet plate under an angle exceeding the acceptance angle of the lenslet plate are transmitted by the lenslet plate but not effectively spatially mixed, thereby leading to spatial artefacts such as colour separation artefacts in a beam profile of a light beam produced by the optical system.

In an embodiment, the spatial pattern is systematically rotated between domains to ensure the desired spatial uniformity in the luminous output of the optical system.

The different groups of solid state lighting elements may be individually addressable to achieve an optical system producing a luminous output having a tuneable spectral composition. For instance, the different spectral compositions may be different colours to achieve a colour tuneable optical system.

In an embodiment, the plurality of solid state lighting elements comprises L groups of solid state lighting elements, L being a positive integer of at least 2; and each domain comprises M rows or columns of N collimators, M and N being positive integers of at least 2 with N≥L, wherein the fixed ratio of solid state lighting elements from each group of solid state lighting elements is maintained within each row or column. In this manner, domains having a desirable aspect ratio (height/width) may be formed.

Each domain may comprise a first plurality of collimators, each collimator of said first plurality being arranged to collimate the luminous output of solid state lighting elements belonging to a first set of groups of solid state lighting elements; and a second plurality of collimators, each collimator of said second plurality being arranged to collimate the luminous output of solid state lighting elements belonging to a second set of groups of solid state lighting elements that does not contain any group of solid state lighting elements belonging to the first set of groups of solid state lighting elements. In other words, different collimators within a domain may collimate light having different, substantially non-overlapping spectral compositions. In such an embodiment, the first plurality of collimators and the second plurality of collimators may be arranged in a checkerboard pattern to homogenize the spatial distribution of the various spectral components of the luminous output of the collimator array to further improve spatial homogeneity in the luminous output of the optical system.

The first set of groups of solid state lighting elements may comprise at least two groups of solid state lighting elements and a spatial order of solid state lighting elements belonging to said first set of groups of solid state elements may be varied across the collimators of said first plurality in order to improve this spatial homogeneity. In addition, this spatial order may be varied between collimators of different domains.

In the lenslet plate, the lenslets of each lenslet array within a unit cell may be arranged in a Fermat spiral in order to achieve particularly good spatial uniformity in the luminous output of the lenslet plate.

The lenslets of each lenslet array preferably are overlapping to obviate non-lenslet spaces in between lenslets in such an array, which if present would need to be made opaque to prevent optical artefacts in the luminous output of the lenslet plate, which would add complexity to the manufacture of such a lenslet array.

Each unit cell may have any suitable shape, such as for example a freeform or a regular shape. In this manner, a wide range of patterns of unit cells may be generated such that the appearance of the optical system (or a lighting device including the optical system) may be varied without compromising the spatial uniformity of its luminous output.

The optical system may further comprise a diffuser optically coupled to the second surface of the lenslet plate to further homogenize the spatial uniformity of the luminous output of the optical system. Such a diffuser preferably is kept as thin as possible in order to limit the thickness of the optical system; for example, the diffuser may be provided in the form of a diffuser film.

According to another aspect, there is provided a lighting device comprising a body housing the optical system of any of the herein described embodiments. Due to the compact nature of the optical system, such a lighting device, e.g. a spotlight or the like, benefits from optionally being compact whilst at the same time achieving excellent uniformity in terms of spectral composition, e.g. colour uniformity, of the light beam produced with such a lighting device. In an embodiment, the lighting device is a light bulb although it is noted that the lighting device may take any suitable form, e.g. a luminaire or the like.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

Figure 1:
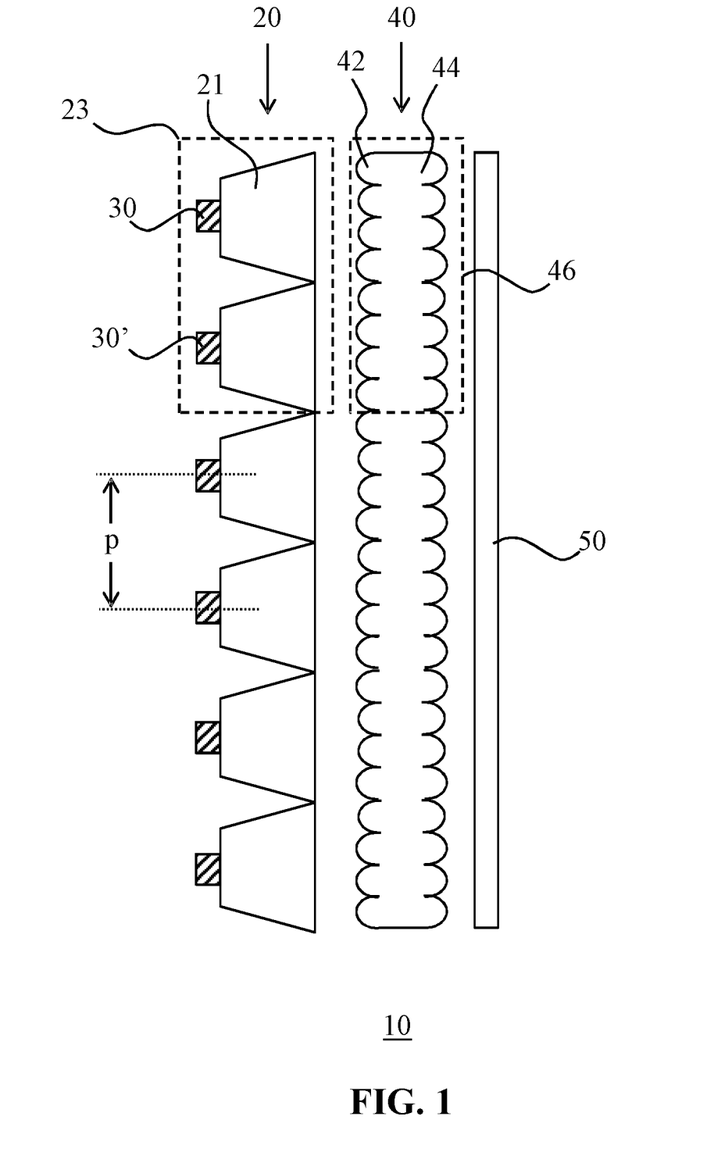
FIG. 1 schematically depicts a cross-sectional view of an optical system according to an embodiment.

FIG. 1 schematically depicts a cross-sectional view of an optical system 10 according to an embodiment of the present invention. The optical system 10 comprises a collimator array 20, which comprises a plurality of collimators 21 at a pitch p, in which p may be in a range of 2-5 mm, e.g. about 3.5 mm. Any suitable type of collimator, e.g. a Fresnel lens or the like, may be used for this purpose. Each collimator 21 is arranged to collimate the luminous output of at least one solid state lighting (SSL) element 30, 30'. The SSL elements of the optical system 10 belong to different groups of SSL elements, with the SSL elements belonging to a particular group being characterized by producing a luminous output having a particular spectral composition, such as light having a particular colour or white light having a particular colour temperature. For example, SSL elements 30 may belong to a first group of SSL elements and SSL elements 30' may belong to a second group of SSL elements. Hence, SSL elements belonging to different groups are distinguishable by producing luminous outputs having different spectral compositions respectively.

For example, a group of SSL elements 30 may consist of red light producing LEDs, a group of SSL elements 30' may consist of green light producing LEDs and a group of SSL elements 30" may consist of blue light producing LEDs such that by individual control of the groups of SSL elements the spectral composition of the luminous output of the optical system 10 may be tuned. For example, in this manner the optical system 10 may be controlled to produce a luminous output with a tunable colour or colour temperature, which may be desirable in a wide variety of application domains such as for example accent lighting in retail environments. Of course, other application domains, such as for example accent lighting in other environments such as a home environment, will be immediately apparent to the skilled person.

Any combination of SSL elements may be used in the optical system 10 according to embodiments of the present invention, such as for example a combination of large and small LEDs. In some applications it further may be advantageous to combine a white light-emitting SSL arrangement such as a COB (chip on board) having a diameter in a range of 6-32 mm with RGB LEDs, e.g. micro LEDs or mini LEDs having sizes in a range of 0.1-0.3 mm approximately.

Where such groups of SSL elements include groups of red, green and blue LEDs, such LEDs may be present in a particular ratio, e.g. R(x), G(y), B(z), in which RGB represent red, green and blue LEDs respectively and x, y and z represent the ratios of such LEDs. For example, R(3), G(2), B(2) denotes a SSL arrangement comprising RGB LEDs in a ratio 3:3:2 whereas R(2), G(3), B(1) denotes a SSL arrangement comprising RGB LEDs in a ratio 2:3:1. Such ratios are typically based on the respective luminous flux of such LEDs in order to ensure that the optical system 10 can produce luminous outputs having a desirable spectral composition, e.g. white light having a particular colour temperature.

The optical system 10 further comprises a lenslet plate 40 comprising a first surface 41 carrying a first array of lenslets 42 and a second surface 43 opposing the first surface 41 carrying a second array of lenslets 44. The shape and area of the lenslet plate 40 typically matches that of the light exit surface of the collimator array 20. Such a lenslet plate 40 typically acts as a Kohler integrator, i.e. the lenslets 42 and 44 are identical and in perfect alignment with each other. The lenslet plate 40 may be made of any suitable optically transmissive material, such as glass or optical grade polymer or polymer blend. In accordance with embodiments of the present invention, the lenslet plate 40 comprises a plurality of unit cells 46. Each unit cell 46 has an identical pattern of lenslets 42, 44 (i.e. all unit cells are identical). The unit cells 46 typically are abutting, such that the lenslet plate or Kohler integrator 40 may be considered as consisting of a plurality of abutting tiles (i.e. the unit cells 46).

The collimator array 20 comprises a plurality of domains 23, with each domain 23 being aligned with (optically coupled to) one of the unit cells 46 of the lenslet plate 40. In particular, each domain is aligned with a respective associated one of said unit cells, hence the number of domains is the same as the number of unit cells. The domains 23 are therefore identical in the sense that they consist of the same number of collimators 21. Moreover, each domain 23 contains the same number of SSL elements 30, 30', and the same ratio of such SSL elements from the different groups of SSL elements such that each domain 23 produces the same luminous flux of spectral components produced by the respective SSL elements 30, 30'.

Such different SSL elements 30, 30' in each domain 23 are typically ordered in some spatial pattern across the collimators 21 in such a domain. For example, where the domain 23 defines a two-dimensional grid of collimators 21 consisting of two rows each comprising three collimators, the spatial pattern may be RGB in each row, that is, the first collimator 21 in such a row may be arranged to collimate the luminous output of a red LED, the second collimator 21 in such a row may be arranged to collimate the luminous output of a green LED and the third collimator 21 in such a row may be arranged to collimate the luminous output of a blue LED.

Figure 2:
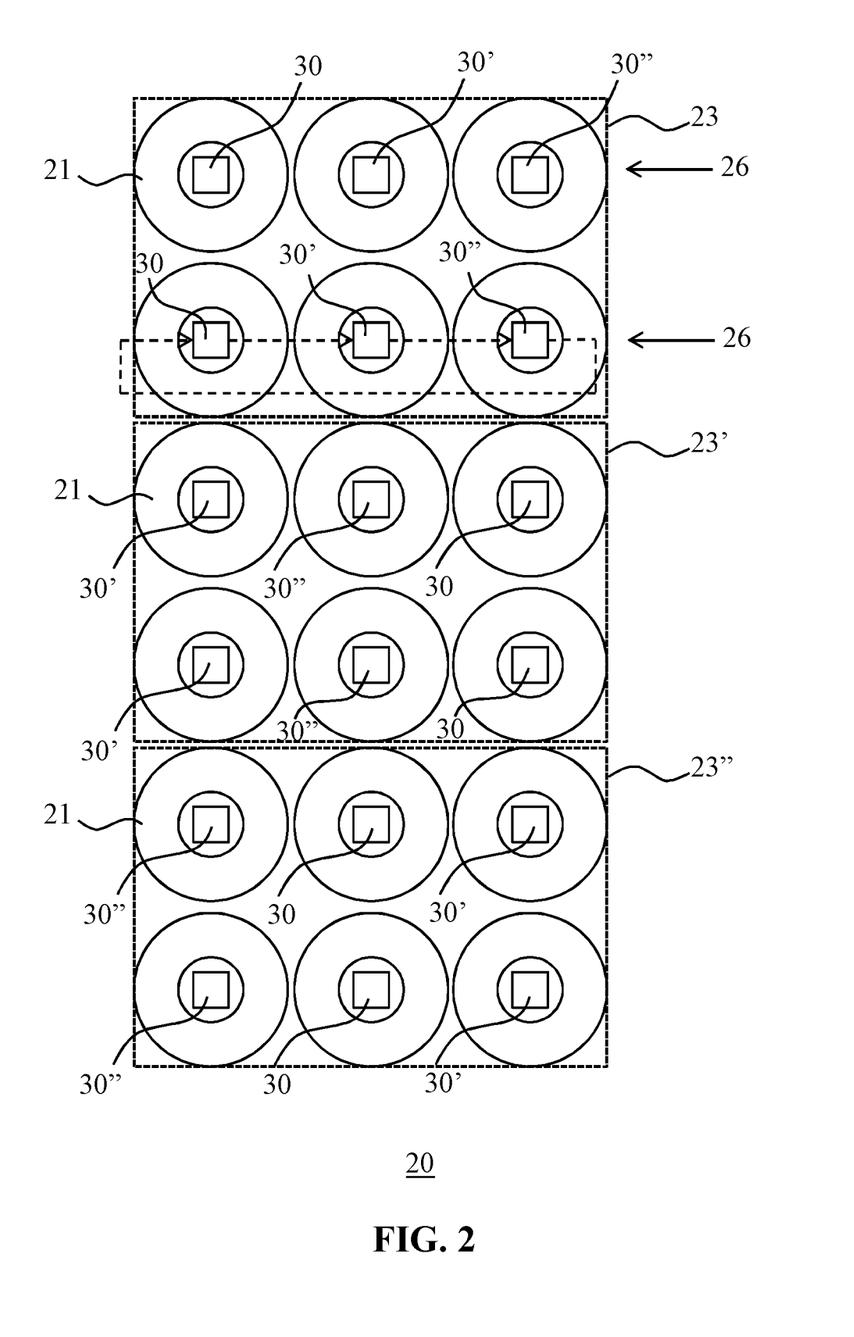
FIG. 2 schematically depicts a plane view of a collimator array of an optical system according to an embodiment.

This is explained in more detail with the aid of FIG. 2, which schematically depicts a plane view of the light entry surfaces of the collimators 21 in the collimator array 20 according to an example embodiment. In this embodiment, as shown the domains 23, 23', 23" mutually have the same shape and each domain 23 consists of two rows 26 of collimators 21 in which for each row 26 the SSL elements 30, 30', 30" are distributed across the collimators 21 in a particular spatial pattern or order, such as 30/30'/30" in the top domain 23. More generally speaking, each domain 23 may consist of a plurality of M rows or columns 26, each comprising N collimators 21, with M and N being positive integers having a value of at least 2. The solid state lighting elements 30, 30', 30" may be divided over L groups of solid state lighting elements in which L is a positive integer having a value of at least 2. For example, L=3 if the optical system comprises three groups of SSL elements such as RGB LEDs. Typically, N≥L, such that each row or column 26 contains Q/M solid state lighting elements arranged in a further spatial pattern in which Q is the total number of solid state elements in the domain 26, wherein in each row or column 26 the fixed ratio of the SSL elements from the different groups preferably is maintained. In FIG. 2, the spatial pattern of the SSL elements 30, 30', 30" within a single domain 23 is replicated (kept unchanged) between the different rows or columns 26 of the domain, but as will be explained later, this is not necessarily the case.

Now, in accordance with embodiments of the present invention, this spatial pattern or order is varied between domains 23, e.g. systematically varied or randomly varied, such that different domains 23 comprising a different spatial distribution of the SSL elements 30, 30', 30" over the collimators 21 in such a domain produce a luminous output having a different spatial distribution of the spectral components produced by the different types of SSL elements within the domain.

This can be recognized in FIG. 2 in which in the spatial pattern of SSL elements 30, 30', 30" in the top domain 23 is rotated clockwise as indicated by the dashed arrows to achieve the spatial pattern of SSL elements 30, 30', 30" (i.e. 30'/30"/30) in the middle domain 23', and the spatial pattern of SSL elements 30, 30', 30" in the middle domain 23' is again rotated clockwise to achieve the spatial pattern of SSL elements 30, 30', 30" (i.e. 30"/30/30') in the bottom domain 23". Preferably, the collimator array 20 comprises the same number of domains 23, 23', 23" comprising the different permutations of the spatial pattern of the SSL elements 30, 30', 30", and in another preferred embodiment all possible permutations of the spatial pattern of the SSL elements 30, 30', 30" is present within the collimator array 20.

By systemically varying the spatial pattern of SSL elements 30, 30', 30" across the different domains 23, 23', 23" of the collimator array 20, the spatial distribution of the various spectral components of the luminous output of these domains is systematically varied. Therefore, when these respective luminous outputs are integrated by the lenslet array 40, owing to the identical unit cells 46 of the lenslet array 40, the luminous output of the optical system 10 becomes homogenized in terms of spatial distribution of these different spectral components, as the systemic variations in the spatial distribution of the various spectral components of the luminous output of the domains 23, 23', 23" of the collimator 20 overlap in the far field, thereby averaging out such spatial separations.

Figure 3:
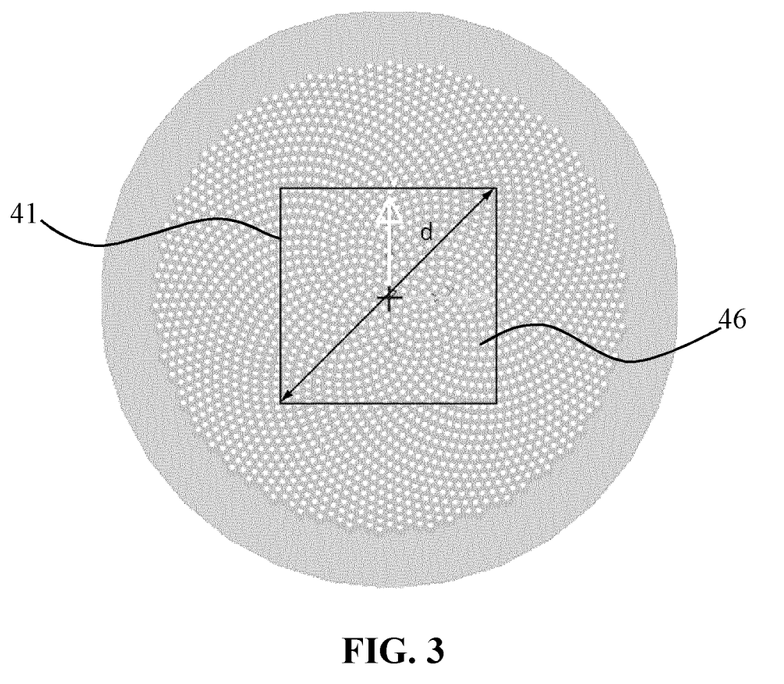
FIG. 3 schematically depicts an example lenslet pattern of a lenslet array.
Figure 4:
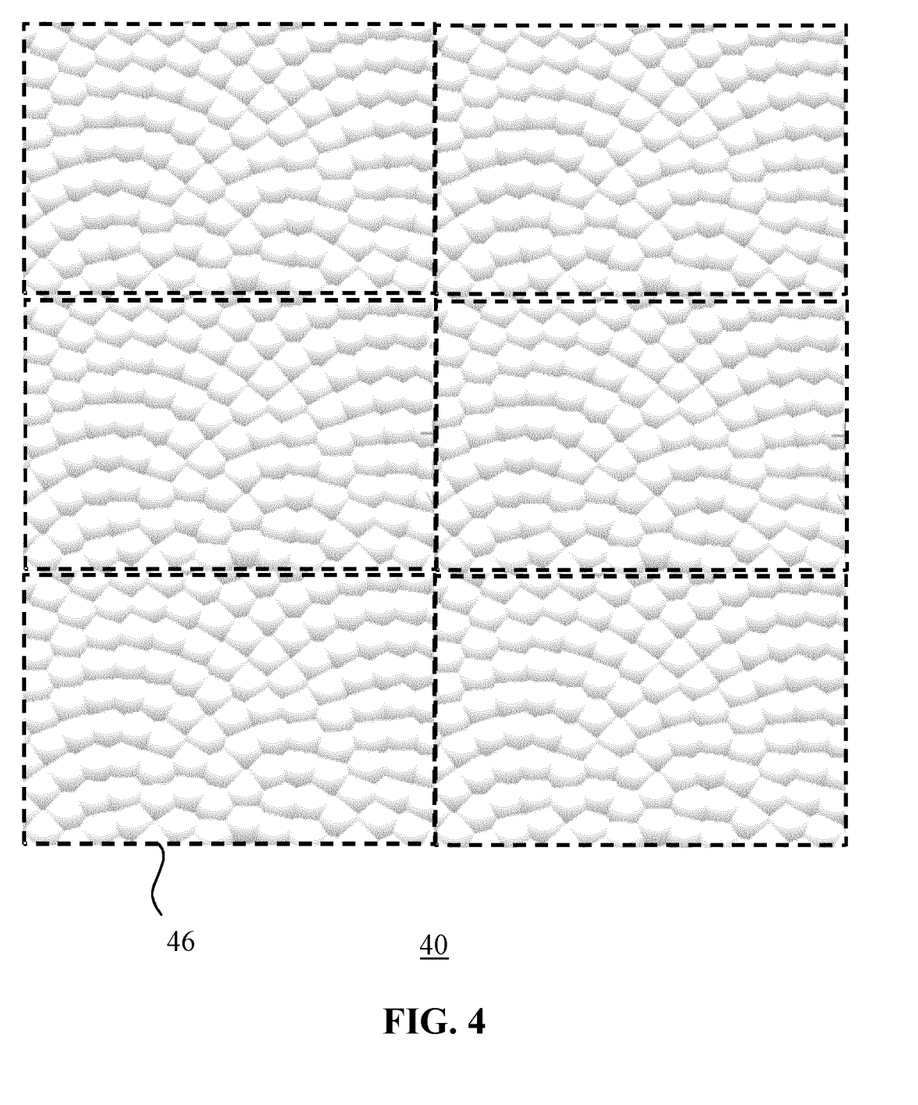
FIG. 4 schematically depicts a lenslet array according to an aspect of an embodiment.

FIG. 3 schematically depicts a front view of a preferred embodiment of a lenslet arrangement of such a unit cell 46, in which the lenslets 42 (and 44) are arranged in a Fermat spiral pattern (also referred to as a phyllotaxis pattern), here shown in its entirety as a disc of such lenslets, in which the unit cell 46 may be considered as a portion of such a spiral, here a square with diameter d. However, it is noted that such unit cells 46 may have any suitable regular shape, such as a rectangular or a hexagonal shape, or even a freeform shape. Any shape that can be used to form such a tiled lenslet plate 40 as schematically depicted in FIG. 4 may be contemplated. An array of lenslets arranged in a Fermat spiral pattern has the advantage that good (radial) uniformity is achieved in the spatial distribution of the luminous output of the unit cell 46 of the lenslet plate 40. Of course, other patterns for such arrays of lenslets 42, 44 may be contemplated. Light emitted by the collimator array 20 is directly coupled into the lenslet plate 40. To this end, the first surface 41 of the lenslet plate 40 may contact the light exit surface of the collimator array 20, or a small air gap may be present between these surfaces instead. As can be seen in FIG. 4, the identical unit cells 46 forming the lenslet plate 40 are typically abutting. The lenslet plate 40 here is shown to have a regular (rectangular) shape by way of non-limiting example only, as other shapes such as freeform shapes are equally feasible.

Figure 5:
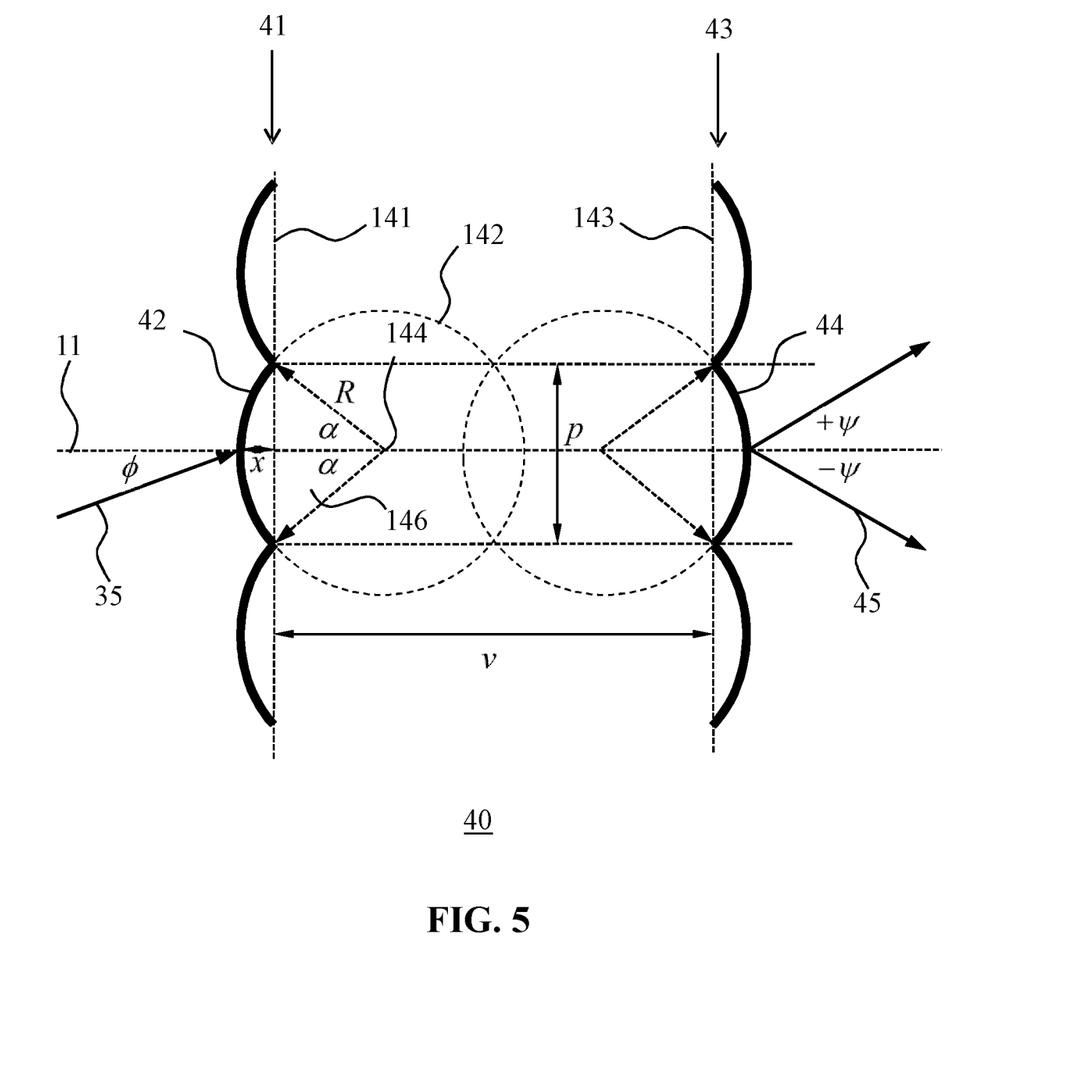
FIG. 5 schematically depicts a cross-sectional view of a lenslet plate of an optical system according to an embodiment.
Figure 6:
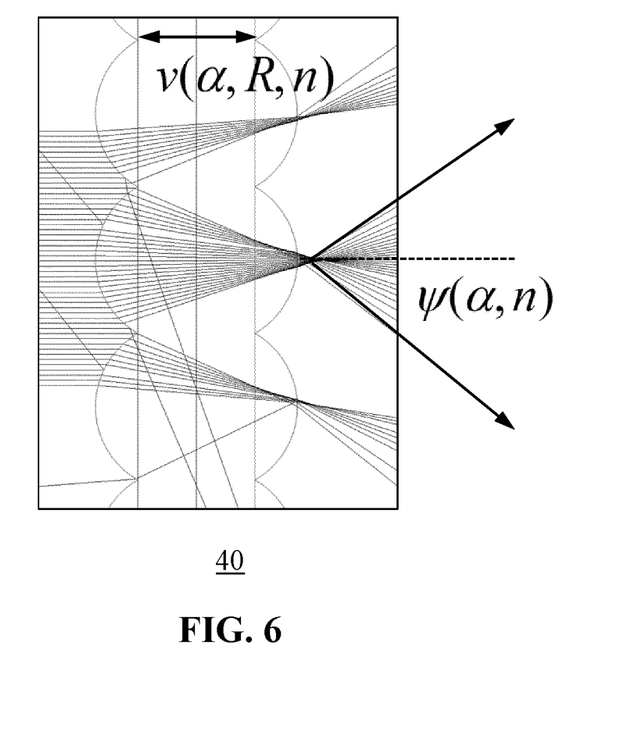
FIG. 6 schematically depicts the optical performance of the lenslet plate of FIG. 5.

FIG. 5 schematically depicts a cross-sectional view of the lenslet array 40 according to an example embodiment. Each lenslet 42 (and 44) is formed as spherical cap of a virtual sphere 142 with radius R. Such a spherical cap defining a lenslet 42 has its perimeter in the virtual plane 141 of the first surface 41 of the lenslet plate 40, whilst a spherical cap defining a lenslet 44 has its perimeter in the virtual plane 143 of the second surface 43 of the lenslet plate 40. The respective spherical caps of the lenslets 42, 44 have a maximum height x relative to the respective virtual planes 141, 143, i.e. in the center of the spherical cap. The virtual planes 141 and 143 are separated from each other by a distance v. The perimeter of each spherical cap defines a directrix with diameter p of a virtual cone 146 having its apex in the center 144 of the virtual sphere 142 such that the virtual cone 146 has a cone angle α defined as the angle between a generatrix (i.e. the sloped surface) of the virtual cone 146 and the optical axis 11 of the optical system 10.

The acceptance or integration angle ψ of a lenslet pair of the lenslet plate 40 defines the range of angles of incident light rays for which the lenslet plate 40 can provide effective mixing. The distance v and the acceptance angle ψ may be expressed as follows:

$$v = R^*\sin\alpha^*\tan\left(\arcsin\left(\frac{\sin\alpha}{n}\right) + \frac{\pi}{2} - \alpha\right) - R(1-\cos\alpha).$$

$$\psi = \arcsin\left[n^*\sin\left[\arctan\left[\frac{1}{\tan\left(\arcsin\left(\frac{\sin\alpha}{n}\right) + \frac{\pi}{2}\right) - \alpha}\right]\right]\right].$$

In the above equations, n is the refractive index of the material from which the lenslet plate 40 is made. The optical performance of the lenslet plate 40 and the respective relationships of v and ψ is also symbolically depicted in FIG. 5. Where light rays 35 are incident under an angle φ=0°, all light rays 45 transmitted by the lenslet plate 40 will be between −ψ and +ψ. However, as soon as |φ|>|ψ|, the light rays 45 transmitted by the lenslet plate 40 will not be sufficiently mixed. Consequently, to ensure that all light rays 35 emanating from the collimator array 20 that are directly incident on the first surface 41 of the lenslet plate 40, the light mixing rod 20 the degree of collimation of the collimator array 20 should be designed accordingly, that is the angle φ of any light ray 35 emitted by the collimator array 20 as defined relative to the optical axis 11 of the optical system 10 should not exceed the integration angle ψ of the lenslet array 40.

In the foregoing example embodiment of the lenslet plate 40, the lenslets 42 and 44 are depicted as non-overlapping lenslets such that gaps will be present in between neighboring lenslets. In such an embodiment, the effective integration angle of the lenslet plate 40 equals that of its individual lenslet pairs. In order to prevent light incident on the lenslet plate 40 from entering the lenslet plate through such gaps, an opaque material, e.g. black paint or the like, may be applied to these gaps. However, in a preferred embodiment such gaps are omitted altogether by providing arrays of overlapping lenslets 42 and 44, for example by arranging such lenslets in a Fermat spiral type of configuration as previously explained. The Cartesian (x, y) coordinates of p lenses (in which p is a positive integer) in such a configuration may be defined as:

$$x = c * \sqrt{p} * \cos(p * 180 * (3-\sqrt{5}))$$

$$y = c * \sqrt{p} * \sin(p * 180 * (3-\sqrt{5}))$$

In these equations, c is a design parameter that controls the amount of overlap between the lenslets in such an array and thereby controls whether any open spaces exist in between the lenslets. In case of such an overlapping lenslet arrangement, the acceptance or integration angle $\psi$ of the lenslet plate 40 effectively reduces to $\psi^*$. Due to the different degrees of overlap between the lenslets 42, 44 in such configurations, the reduced effective acceptance or integration angle $\psi^*$ typically can only be obtained numerically. For the avoidance of doubt, it is noted that in such a case, the angle $\phi$ of any light ray 35 emitted by the collimator array 20 as defined relative to the optical axis 11 of the optical system 10 should not exceed the effective acceptance angle $\psi^*$ of the lenslet array 40. In the context of the present application, where reference is made to the actual acceptance angle of a lenslet plate 40, this is intended to refer to the acceptance angle $\psi$ in case of a lenslet plate having non-overlapping lenslets 42, 44 and to the effective acceptance angle $\psi^*$ in case of a lenslet plate having overlapping lenslets 42, 44.

The optical performance of the optical system 10 will now be demonstrated with the aid of an example implementation of the optical system comprising red LEDs having a luminous flux of 0.54 lm, a peak wavelength of 619 nm and a Gaussian FWHM of 18.8 nm, green LEDs having a luminous flux of 2.09 lm, a peak wavelength of 556 nm and a Gaussian FWHM of 18.8 nm and blue LEDs having a luminous flux of 0.14 lm, a peak wavelength of 468 nm and a Gaussian FWHM of 18.8 nm, such that the luminous outputs of these LEDs (when fully mixed) combine to yield white light with a colour temperature of about 5,000 K. The collimator array 20 of the optical system 10 comprises three domains 26, 26' and 26" as depicted in FIG. 2 in which the spatial pattern of the RGB LEDs is systematically varied across these domains as explained in more detail above. The lenslet array 40 comprises overlapping lenslets 42, 44 in a phyllotaxis pattern and has an effective (actual) acceptance angle of 12°. The collimator array 20 is matched to the lenslet plate 40 in that the degree of collimation produced by the collimator array 20 is such that all light rays emitted by the collimator array have an emission angle $\phi$ relative to the optical axis 11 of the optical system 10 not exceeding 12°.

Figure 7:
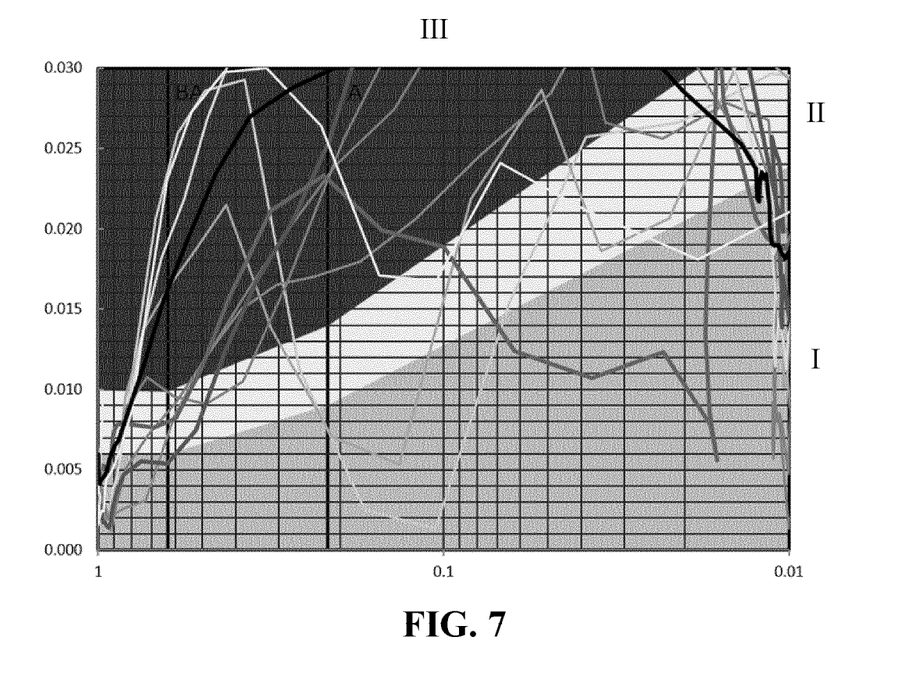
FIG. 7 depicts a plot of colour uniformity (Δu'v') as a function of relative intensity of a luminous output part of an optical system according to an example embodiment.

FIG. 7 is a graph of the far field colour uniformity ($\Delta u'v'$) as a function of relative intensity of the optical system 10 when only the LEDs belonging to domain 26 are switched on. The colour uniformity plot shows three differently shaded regions I, II and III in which region I represents good colour uniformity, region II represents unsatisfactory colour uniformity and region III represents poor colour uniformity. The various lines in the graph depict different spatial regions of the far field luminous output of the optical system 10. As can be seen from this graph, significant colour separation exists in the beam produced by the optical system 10 when only the LEDs of the domain 26 are engaged. In particular, the edge or corona of this beam around the beam cut-off suffers from such colour separation.

Figure 8:
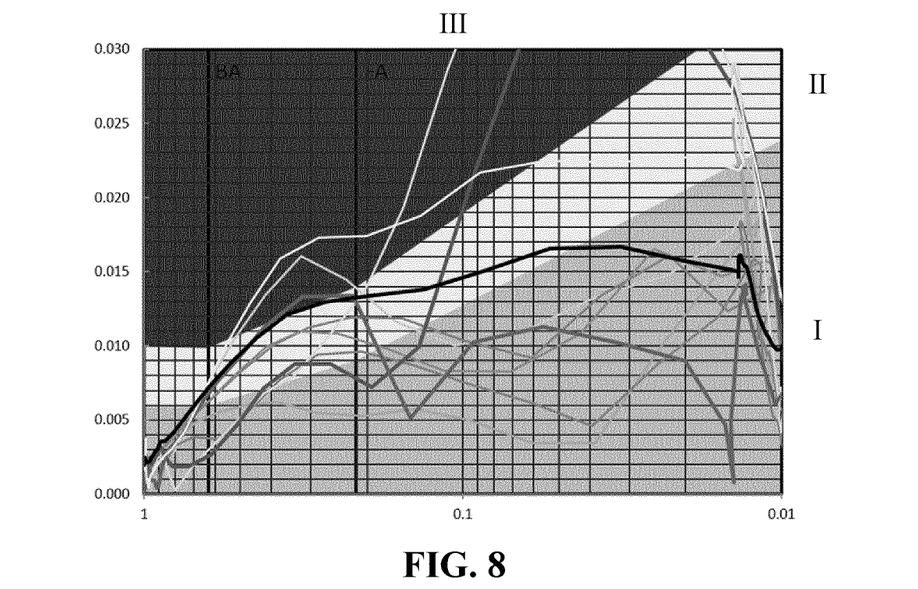
FIG. 8 depicts a plot of colour uniformity (Δu'v') as a function of relative intensity of another luminous output part of an optical system according to an example embodiment.

FIG. 8 is a graph of the far field colour uniformity ($\Delta u'v'$) as a function of relative intensity of the optical system 10 obtained when the LEDs belonging to domains 26 and 26' are switched on, in which the spatial pattern of LEDs in domain 26' is clockwise rotated relative to the spatial pattern of LEDs in domain 26 (i.e. the sequence RGB in domain 26 is transformed into the sequence GBR in domain 26'). As can be seen from this graph, a significant improvement in colour uniformity is achieved in the beam produced by the optical system 10 when the LEDs of both the domains 26 and 26' are engaged. In particular, the colour separation at the edge of this beam is significantly reduced, thus providing a beam profile with improved colour uniformity.

Figure 9:
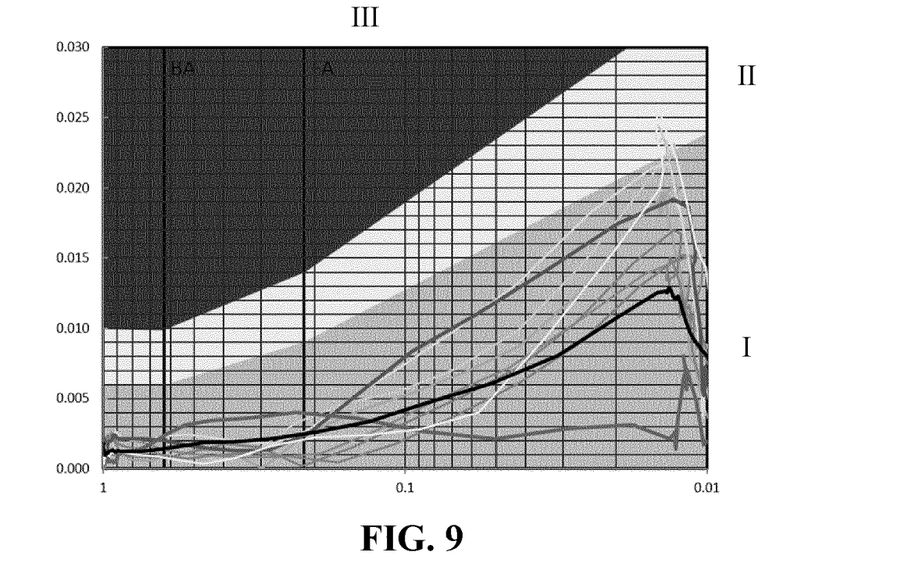
FIG. 9 depicts a plot of colour uniformity (Δu'v') as a function of relative intensity of the total luminous output of an optical system according to an example embodiment.

FIG. 9 is a graph of the far field colour uniformity ($\Delta u'v'$) as a function of relative intensity of the optical system 10 obtained when the LEDs belonging to domains 26, 26' and 26" are all switched on, in which the spatial pattern of LEDs in domain 26' is clockwise rotated relative to the spatial pattern of LEDs in domain 26 (i.e. the sequence RGB in domain 26 is transformed into the sequence GBR in domain 26') and the spatial pattern of LEDs in domain 26" is clockwise rotated relative to the spatial pattern of LEDs in domain 26' (i.e. the sequence GBR in domain 26' is transformed into the sequence BRG in domain 26"). As can be seen from this graph, excellent colour uniformity is achieved in the beam produced by the optical system 10 when the LEDs of all domains 26, 26' and 26" are engaged. In particular, the colour separation at the edge of this beam is virtually non-existent, thus providing a beam profile with good colour uniformity.

Figure 10:
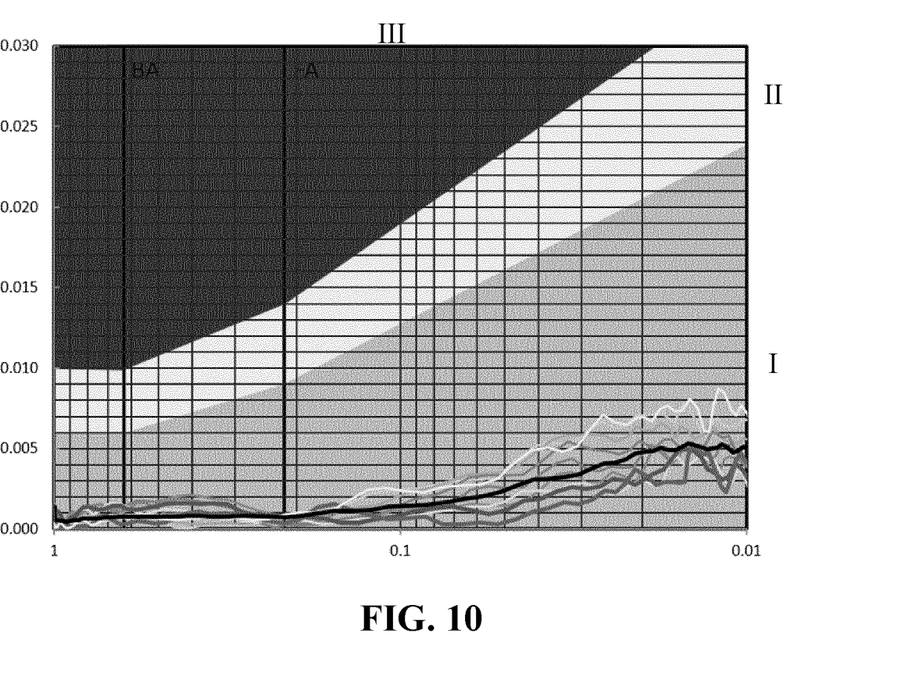
FIG. 10 depicts a plot of colour uniformity (Δu'v') as a function of relative intensity of the total luminous output of an optical system according to another example embodiment.

FIG. 10 is a graph of the far field colour uniformity ($\Delta u'v'$) as a function of relative intensity of the optical system 10 when the LEDs belonging to domains 26, 26' and 26" as described in the detailed description of FIG. 10 are all switched on, and to which a diffuser film 50 (M-PR 15 diffuser as marketed by BrightView technologies of Durham, USA) was added to diffuse the luminous output as produced by the lenslet plate 40. As can be seen from this graph, this further improves the colour uniformity in the beam produced by the optical system 10 and produces a particularly homogeneous luminous output having a Gaussian emission profile having a FWHM of 25.9°.

Figure 11:
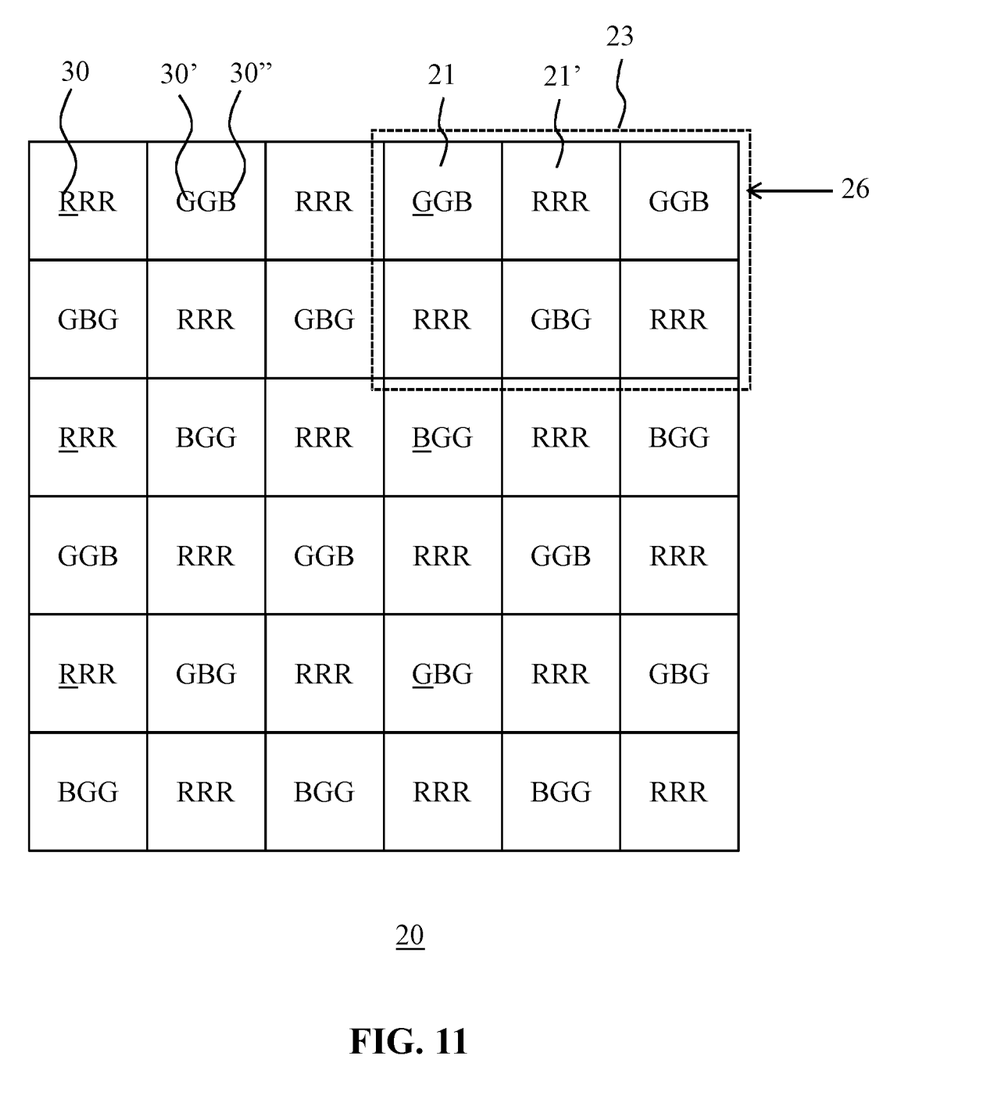
FIG. 11 schematically depicts a plane view of a collimator array of an optical system according to another embodiment.

FIG. 11 schematically depicts a plane view of the collimator array 20 according to another example embodiment. In this embodiment, each domain 23 consists of two rows 26 of collimators 21, 21' by way of non-limiting example. The collimators 21, 21' are structurally identical but are associated with different sets of SSL elements. For example, the collimators 21 may be associated with a first set of SSL elements 30', 30", e.g. green (G) and blue (B) LEDs, whereas the collimators 21' may be associated with a second set of SSL elements 30, e.g. red (R) LEDs. More generally speaking, different collimators 21, 21' may be associated with solid state lighting elements belonging to different sets of groups of solid state lighting elements, in which each group of SSL elements belongs to a single set only, e.g. any set of groups of solid state lighting elements does not contain a group of solid state lighting elements belonging to the another set of groups of solid state lighting elements.

So in the example embodiment depicted in FIG. 11, the collimators 21 comprise SSL elements 30', 30" belonging to a first set of groups of SSL elements containing the green LEDs and blue LEDs, and the collimators 21' comprise SSL elements 30 belonging to a first set of groups of SSL elements containing the red LEDs. This for example is advantageous where the SSL elements 30, 30', 30" are present within each domain 23 in a particular stoichiometry or ratio, e.g. R:G:B=3:2:1 in the present example, such that the combination of blue and green LEDs yields a set of LEDs containing the same number of LEDs as the set of LEDs comprising the red LEDs. As will be understood by the skilled person, for different ratios different set distributions may be more suitable. Importantly, the number SSL elements and the ratio of different SSL elements remains the same for each domain 23 for previously explained reasons.

Each collimator 21, 21' may be arranged to collimate the luminous outputs of the same number of SSL elements, e.g. three SSL elements as shown in FIG. 14. Consequently, collimators 21 are arranged to collimate the luminous outputs of two green LEDs and one blue LED (belonging to the first set) and collimators 21' are arranged to collimate the luminous outputs of three red LEDs (belonging to the second set). The collimators 21 and 21' may be arranged in a checkerboard pattern to homogenize the different spectral components of the luminous output of each domain 23 as much as possible. In the respective domains 23, the SSL element identifying a starting point of the spatial pattern of SSL elements 30, 30', 30" in the domain is underlined, such that the (systematic) variation of this spatial pattern between domains can be more easily recognized.

Furthermore, the collimators (here collimators 21) containing SSL elements that produce luminous output with different spectral compositions, e.g. different colours, will produce a luminous output having some spatial separation of these different spectral components. This is because within each of such collimators, the SSL elements (here SSL elements 30', 30") will be arranged in a further spatial pattern, e.g. GGB, GBG or BGG for a collimator containing two green (G) and one blue LED. In order to further homogenize the luminous output of the optical system 10, this further spatial pattern may be varied as well, e.g. randomly or systematically varied, between different domains 23 as well as within a single domain 23, e.g. between different rows or columns 26 of such a domain. For example, as shown in FIG. 14, in the top row 26 all collimators 21 contain the SSL elements 30', 30" in a GGB pattern, whereas in the second row from the top, this pattern is rotated to a GBG pattern, and in the third row from the top, this pattern is rotated to a BGG pattern. Hence, not only is such systematic variation of the spatial patterns performed between the collimators 21, 21" of different domains (as evidenced by the changing position of the RRR patterns between different domains 23 for example), but also spatial patterns within individual collimators 21 comprising SSL elements producing luminous outputs having different spectral compositions may be systematically varied between collimators to improve the colour uniformity of the luminous output of the optical system 10.

Figure 12:
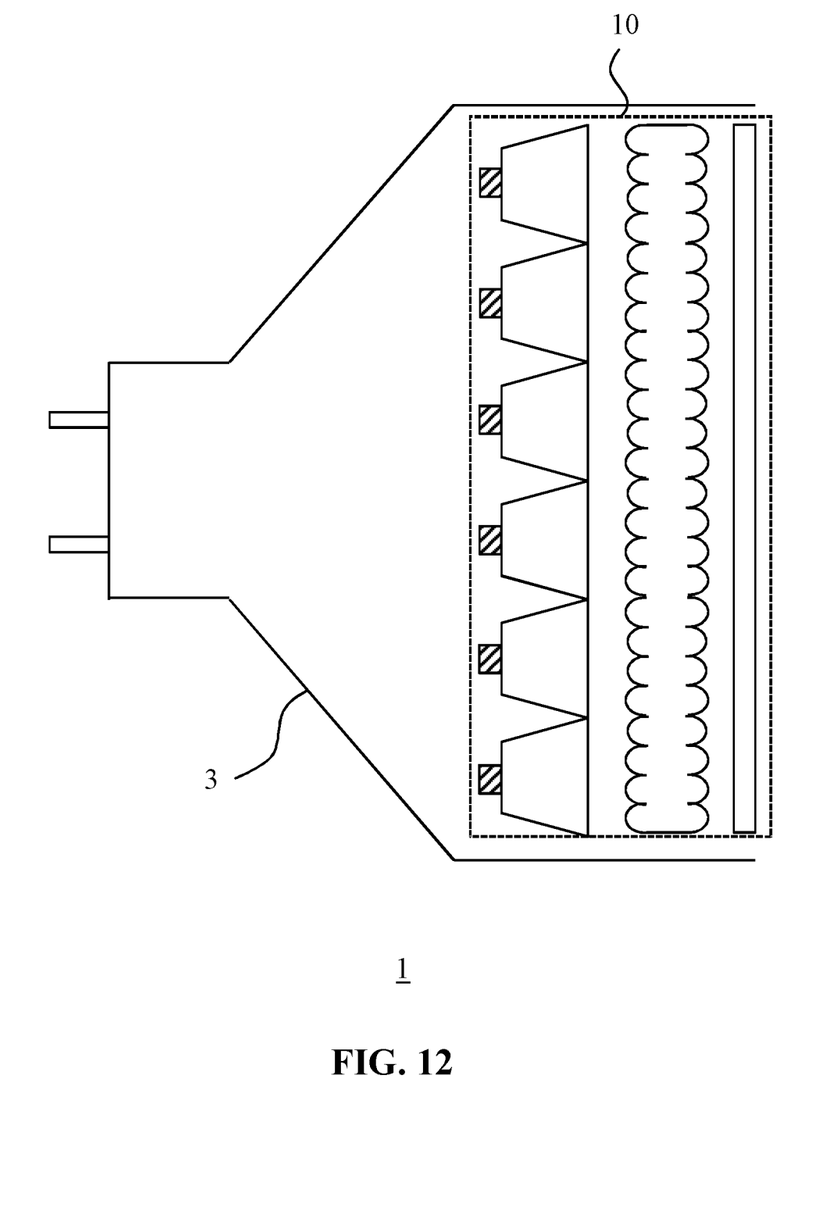
FIG. 12 schematically depicts a cross-sectional view of a lighting device according to an embodiment.

The optical system 10 may be integrated in the body or housing 3 of a lighting device 1 as schematically depicted in FIG. 12. Such a lighting device 1 may be a light bulb or luminaire, e.g. to provide freeform, colour-tuneable accent lighting.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An optical system comprising:
   a plurality of solid state lighting elements belonging to L different groups, wherein L being a positive integer of at least 2, and wherein solid state lighting elements of different groups produce luminous outputs having different spectral compositions;
   a collimator array comprising a plurality of domains, wherein the domains mutually are identical and have the same shape and each domain comprises a same number of plurality of collimators, wherein within each domain each collimator is arranged to collimate the luminous output of at least one solid state lighting element such that each domain contains a same number of solid state lighting elements arranged in a spatial pattern, said same number consisting of a fixed ratio of solid state lighting elements from each group, and wherein said spatial pattern is varied between domains; and
   a lenslet plate having a first lenslet array on a first surface facing the collimator array and a second lenslet array identical to the first lenslet array on a second surface opposing the first surface, wherein each lenslet of the first lenslet array is aligned with a corresponding lenslet of the second lenslet array and each lenslet array is composed of a plurality of identical unit cells comprising a plurality of lenslets arranged in an identical portion of a Fermat spiral pattern, wherein the number of domains is the same as the number of unit cells and each of said domains being optically coupled with a respective associated one of said unit cells.

2. The optical system of claim 1, wherein said spatial pattern is systematically rotated between domains.

3. The optical system of claim 1, wherein the groups of solid state lighting elements are individually addressable.

4. The optical system of claim 1, wherein the different spectral compositions are different colours.

5. The optical system of claim 1, wherein:
   each domain comprises M rows or columns of N collimators, M and N being positive integers of at least 2 with N≥L; and
   the fixed ratio of solid state lighting elements from each group of solid state lighting elements is maintained within each row or column.

6. The optical system of claim 1, wherein the light rays produced by the collimator array have a maximum angle ($\varphi$) relative to the optical axis of the optical system, said maximum angle not exceeding an actual acceptance angle ($\psi$, $\psi^*$) of the lenslet plate.

7. The optical system of claim 1, wherein each domain comprises:
   a first plurality of collimators, each collimator of said first plurality being arranged to collimate the luminous output of solid state lighting elements belonging to a first set of groups of solid state lighting elements; and a second plurality of collimators, each collimator of said second plurality being arranged to collimate the luminous output of solid state lighting elements belonging to a second set of groups of solid state lighting elements that does not contain any group of solid state lighting elements belonging to the first set of groups of solid state lighting elements.

8. The optical system of claim 7, wherein the first plurality of collimators and the second plurality of collimators are arranged in a checkerboard pattern.

9. The optical system of claim 8, wherein:

the first set of groups of solid state lighting elements comprises at least two groups of solid state lighting elements; and a spatial order of solid state lighting elements belonging to said first set of groups of solid state elements is varied across the collimators of said first plurality.

10. The optical system of claim 1, wherein L is a positive integer of at least 3.

11. The optical system of claim 1, wherein the lenslets of each lenslet array are overlapping.

12. The optical system of claim 1, wherein each unit cell has a freeform or a regular shape.

13. The optical system of claim 1, further comprising a diffuser optically coupled to the second surface of the lenslet plate.

14. A lighting device comprising a body housing the optical system of claim 1.

15. The lighting device of claim 14, wherein the lighting device is a light bulb.

* * * * *